United States Patent
Alshawabkeh et al.

(10) Patent No.: US 11,809,716 B2
(45) Date of Patent: Nov. 7, 2023

(54) PREDICTION AND PRIORITIZATION OF SOLID-STATE DRIVES REPLACEMENT

(71) Applicant: Dell Products L.P., Hopkinton, MA (US)

(72) Inventors: Malak Alshawabkeh, Franklin, MA (US); Kunxiu Gao, Boxborough, MA (US); Kuolin Hua, Natick, MA (US)

(73) Assignee: Dell Products L.P., Hopkinton, MA (US)

( * ) Notice: Subject to any disclaimer, the term of this patent is extended or adjusted under 35 U.S.C. 154(b) by 10 days.

(21) Appl. No.: 17/579,648

(22) Filed: Jan. 20, 2022

(65) Prior Publication Data

US 2023/0229315 A1    Jul. 20, 2023

(51) Int. Cl.
*G06F 3/06*    (2006.01)

(52) U.S. Cl.
CPC .......... *G06F 3/0617* (2013.01); *G06F 3/0653* (2013.01); *G06F 3/0689* (2013.01)

(58) Field of Classification Search
CPC ..... G06F 3/0617; G06F 3/0653; G06F 3/0689
See application file for complete search history.

(56) References Cited

U.S. PATENT DOCUMENTS

| | | | | |
|---|---|---|---|---|
| 2017/0017557 A1* | 1/2017 | Oshima | ................. | G06F 11/008 |
| 2019/0138415 A1* | 5/2019 | Chen | ................. | G06F 3/0653 |
| 2021/0303175 A1* | 9/2021 | Saga | ................. | G06F 3/0631 |
| 2021/0382631 A1* | 12/2021 | Singh | ................. | G06F 3/0653 |
| 2022/0100389 A1* | 3/2022 | Lv | ................. | G06F 11/3058 |
| 2022/0382616 A1* | 12/2022 | Brych | ................. | G06F 11/0751 |

OTHER PUBLICATIONS

Wang, Haifeng, and Haili Zhang. "AIOPS prediction for hard drive failures based on stacking ensemble model." 2020 10th Annual Computing and Communication Workshop and Conference (CCWC). IEEE, 2020. (Year: 2020).*
Pinciroli, Riccardo, et al. "Lifespan and Failures of SSDs and HDDs: Similarities, Differences, and Prediction Models." IEEE Transactions on Dependable and Secure Computing (2021). (Year: 2021).*

* cited by examiner

*Primary Examiner* — Nicholas J Simonetti
(74) *Attorney, Agent, or Firm* — ANDERSON GORECKI LLP

(57) ABSTRACT

The lifespans of the solid stated drives (SSDs) of a storage array are modelled using linear regression with monitored wear level and power-on time. The models predict when individual SSDs will reach a wear level corresponding to readiness for replacement. A drive replacement process makes efficient use of available empty drive slots to replace SSDs in batches. SSDs that are ready for replacement are ranked in terms of priority for replacement. If the number of SSDs that are ready for replacement exceeds the number of available empty drive slots, then ranking us used to assign individual SSDs to different batches for replacement.

20 Claims, 6 Drawing Sheets

| Disk/Partition | 1 | 2 | 3 | 4 | 5 |
|---|---|---|---|---|---|
| 1 | a | b | c | d |   |
| 2 | a | b | c | d |   |
| 3 | a | b | c |   | e |
| 4 | a | b |   | e | f |
| 5 | a |   | e | f | g |
| 6 |   | e | f | g |   |
| 7 | e | f | g | d |   |
| 8 | f | g | c | d |   |
| 9 | g | b | c | d |   |
| 10 | h | i | j | k | l |
| 11 | h | i | j | k | l |
| 12 | h | i | j | k | l |
| 13 | h | i | j | k | l |
| 14 | h | i | j | k | l |

Figure 6

PREDICTION AND PRIORITIZATION OF SOLID-STATE DRIVES REPLACEMENT

TECHNICAL FIELD

The subject matter of this disclosure is generally related to replacement of disk drives in a data storage system.

BACKGROUND

Mass data storage systems typically include a large number of disk drives. Disk drives have limited lifespans and eventually require replacement. Drive replacement can be accomplished by "swapping out" an existing drive for a new drive by mounting the new drive in an empty drive slot of the storage system, copying data from the existing drive to the new drive, and removing the existing drive from the storage system after all the data has been copied to the new drive and the new drive has been entered into service, thereby freeing the drive slot used for the swap out procedure.

Technology such as redundant arrays of independent disks (RAID) may be implemented to help avoid data loss in the event of drive failure. The non-failed members of a RAID protection group can be used to rebuild a failed member. However, failure of a drive initiates a race condition in which the failed drive must be replaced before failure of one or more additional drives associated with the same protection group makes it impossible to rebuild the failed drives. This can be problematic in large, geographically remote data centers because a service visit to install new drives may require days to schedule. Consequently, replacing drives as they fail may not be practical. In order to reduce the possibility of disruptive drive failures, it is known to proactively replace disk drives prior to failure. For example, drives that are indicated to be close to failure may be swapped out before failing. However, simply swapping out drives as they are indicated to be close to failure is often inefficient in terms of the number of required service visits.

SUMMARY

In accordance with some implementations, a method is implemented with a storage system comprising a plurality of non-volatile data storage drives, the method comprising: for each of the drives, monitoring drive wear level; for each of the drives, monitoring drive power-on time; generating, for each of the drives, a model of expected drive lifespan based on the monitored drive wear level and the monitored drive power-on time, resulting in a plurality of drive models; for each of the drives, using the corresponding drive model to calculate a point in time when that drive will have been in service for a predetermined portion of its modelled lifespan; and swapping out ones of the drives on or after the calculated points in time when those drives have been in service for the predetermined portion of their respective lifespans according to the corresponding drive model.

In accordance with some implementations, a non-transitory computer-readable storage medium stores instructions that when executed by a computer cause the computer to perform a method with a storage system comprising a plurality of non-volatile data storage drives, the method comprising: for each of the drives, monitoring drive wear level; for each of the drives, monitoring drive power-on time; generating, for each of the drives, a model of expected drive lifespan based on the monitored drive wear level and the monitored drive power-on time, resulting in a plurality of drive models; for each of the drives, using the corresponding drive model to calculate a point in time when that drive will have been in service for a predetermined portion of its modeled lifespan; and swapping out ones of the drives on or after the calculated points in time when those drives have been in service for the predetermined portion of their respective lifespans according to the corresponding drive model.

In accordance with some implementations, an apparatus comprises: at least one compute node; a drive array comprising a plurality of drive slots and a plurality of non-volatile data storage drives mounted in the drive slots; and program code non-transitory computer-readable storage medium that when run by a processor monitors drive wear level of each of the drives, monitors drive power-on time of each of the drives, generates, for each of the drives, a model of expected drive lifespan based on the monitored drive wear level and the monitored drive power-on time, resulting in a plurality of drive models, uses, for each of the drives, the corresponding drive model to calculate a point in time when that drive will have been in service for a predetermined portion of its modeled lifespan, and prompts ones of the drives to be swapped out on or after the calculated points in time when those drives have been in service for the predetermined portion of their respective lifespans according to the corresponding drive model.

This summary is not intended to limit the scope of the claims or the disclosure. Other aspects, features, and implementations will become apparent in view of the detailed description and figures, and all the examples, aspects, implementations, and features can be combined in any technically possible way.

BRIEF DESCRIPTION OF THE FIGURES

FIGS. 5 and 6 illustrate drive priority calculation and ranking.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
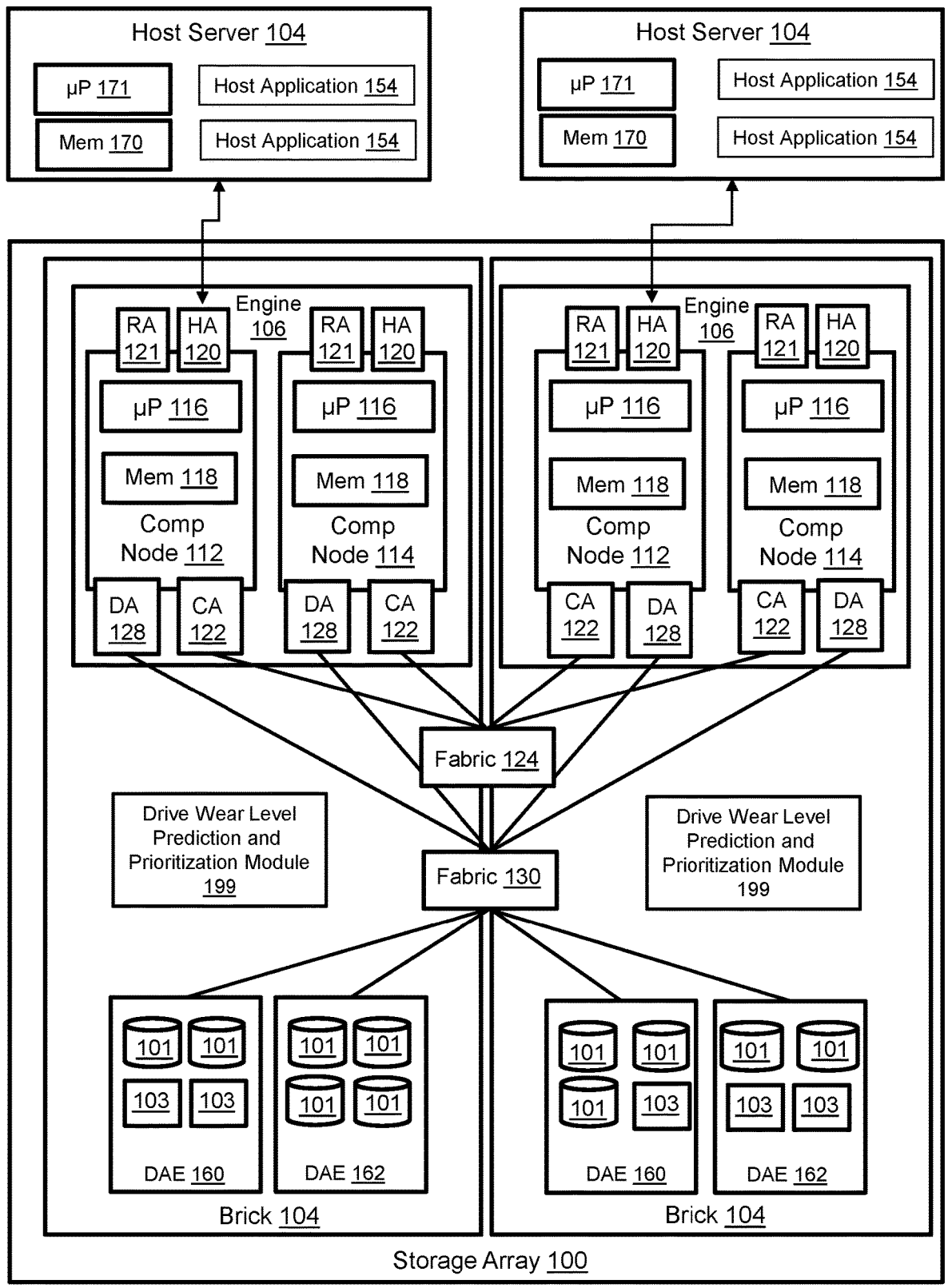
FIG. 1 illustrates a simplified data center environment with host servers and a storage array that utilizes drive wear level prediction and prioritization modules to facilitate drive swap-out.

FIG. 1 illustrates a simplified data center environment with host servers 104 and a storage array 100 that utilizes drive wear level prediction and prioritization modules 199 to facilitate efficient swap-out of drives. In some implementations the drive wear level prediction and prioritization modules 199 are remotely located, e.g., outside the storage array and/or outside the data center. As will be explained in greater detail below, the drive wear level prediction and prioritization modules generate models of each solid-state drive (SSD) used by the storage array. The models, which indicate expected drive wear level as a function of power-on time, are used to predict when individual drives will become ready for swap-out. The output of the models is used to automatically plan and execute swap out of drives in batches corresponding to the number of empty drive slots, which tends to be more efficient than swapping out drives individually as they approach endurance limits. Those of ordinary skill in the art will recognize that the storage array would typically support more than two host servers and the data center could include multiple storage arrays. Nevertheless, the techniques and features disclosed herein are applicable to such larger scale implementations.

The host servers 104 include volatile memory 170 and one or more tangible processors 171. The memory and processors are used to run instances of host applications 154. An individual host server may simultaneously support instances of a single host application or instances of multiple host applications. Instances of host applications prompt generation of input-output commands (IOs) to read and/or write host application data that is maintained by the storage array 100 on managed drives 101. Examples of host applications may include, but are not limited to, software for email, sales, accounting, inventory control, manufacturing, engineering, and a wide variety of other functions.

The storage array 100 includes one or more bricks 104. Each brick includes an engine 106 and one or more disk array enclosures (DAEs) 160, 162. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the host servers 103, 104 from the compute nodes 112, 114. Nevertheless, the host applications could run on the compute nodes. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with the managed drives 101 and empty drive slots 103 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. Disk controllers may be associated with the managed drives as is known in the art. An interconnecting fabric 130 enables all disk adapters to communicate with all managed drives and empty drive slots.

Figure 2:
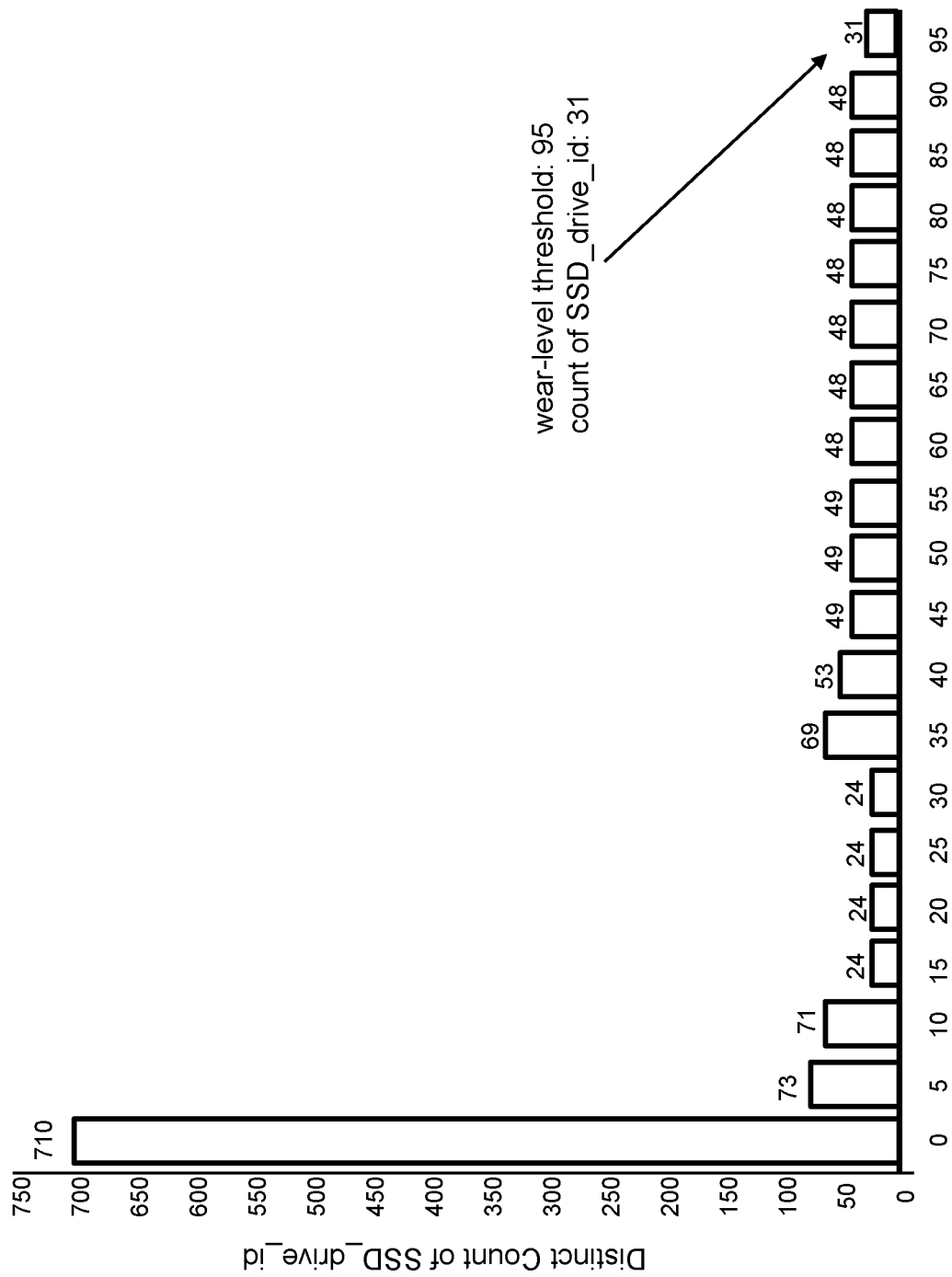
FIG. 2 illustrates wear levels of managed drives of the storage array of FIG. 1.

Referring to FIGS. 1 and 2, the managed drives 101 include non-volatile storage media that may be of any type, e.g., solid-state drives (SSDs) based on EEPROM technology such as NAND and NOR flash memory and hard disk drives (HDDs) with spinning disk magnetic storage media. However, for ease of explanation the managed drives 101 described herein are all SSDs. SSDs most often fail by reaching maximum endurance in terms of writes or program/erase cycles. Consequently, SSD manufacturers rate the expected lifespan of drives in terms of endurance. The wear level of a managed drive 101 is a function of the rated endurance of the drive and the amount of the rated endurance that has been utilized (or remains). Because it is known to express wear level in terms of either utilized endurance or remaining endurance, it should be noted that utilized endurance will be used in the following description. For example, a managed drive that is new (unused) has a wear level of 0%, a managed drives that has been utilized for half of its rated endurance has a wear level of 50%, and a managed drive that has been utilized for all of its rated endurance has a wear level of 100%. A managed drive with at least a predetermined wear level, e.g., 95%, may be considered to be in condition for swap out. A calculable period of time, e.g., one or more weeks, may be expected to pass before a drive at 95% wear level reaches 100% wear level. The selection of 95% is a design choice that represents a tradeoff between available time for drive swap out and efficient utilization of drive lifespan. Although 95% wear level will be used in the present description to indicate readiness for swap out, that should not be considered a limitation of the invention.

At any point in time, the storage array may have managed drives at a variety of wear levels, and multiple drives may have similar wear level. Managed drives of the storage array could simply be swapped out in order upon reaching a wear level of 95%. However, that technique can lead to inefficiency as drives reach 95% wear level in succession. Moreover, not all drives present equal potential data loss as a result of drive failure. It is possible to swap out as many drives as there are empty drive slots during a single service visit, so a storage array with N empty drive slots will accommodate a batch of N drives being swapped out in a single service visit. Swapping out five drives that reach 95% wear level on five consecutive days with five separate service visits is less efficient than waiting until all five drives are ready for swap out and then replacing all five drives in a single service visit. Moreover, randomly selecting N drives from N+M drives that are ready to be swapped out presents a risk that a low-risk drive will be swapped out before a high risk drive, where risk correlates with potential data loss.

Figure 3:
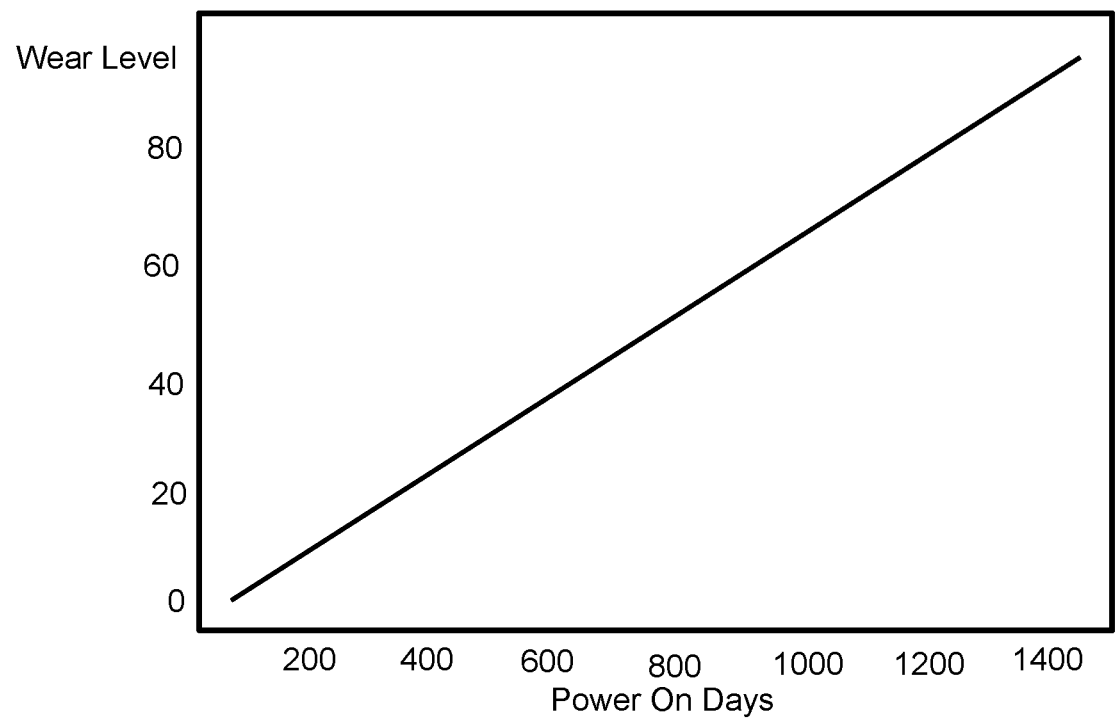
FIG. 3 illustrates a model of wear level of a managed drive as a function of power-on time.

FIG. 3 illustrates a model of wear level of a managed drive as a function of power-on time. The drive wear level prediction and prioritization modules monitor the wear level and power-on time of each of the managed drives. Recorded values of wear level and power-on time are used to predict future drive wear level as a function of power-on time. Drives can be modelled using machine learning linear regression. Machine learning linear regression approximates a causal relationship between two or more variables. In the illustrated example, power-on time is the independent variable and wear level is the dependent variable. A suitable linear regression equation is $Y=\beta 0+\beta 1*x1+\varepsilon$, where Y is wear level, x is power-on time, $\beta 1$ is a coefficient that quantifies the effect of power-on time, and $\beta 0$ is the minimum value of wear level yields a model that indicates when the modelled drive will reach the predetermined threshold value of wear level corresponding to readiness for swap out, e.g., 95%. In the illustrated example, which represents an actual SSD, each 14 days of power-on corresponds to a 1% increase in wear level. The same type of drive may exhibit a different relationship between power-on time and wear level in a different storage array or data center, so each drive is individually modelled. Moreover, the models are recalculated and refined based on additional monitored wear level and power-on time. The remaining power-on time until reaching wear levels of 95% and 100% is known from the model and can be translated into calendar dates corresponding to a window of time in which the drive should be swapped out. The number of available empty drive slots is also known. Thus, it is possible to calculate when to schedule a service visit to replace a maximally numbered batch of drives that are ready for swap out, up to the number of empty drive slots, before any of the drives reach 100% wear level.

Figure 4:
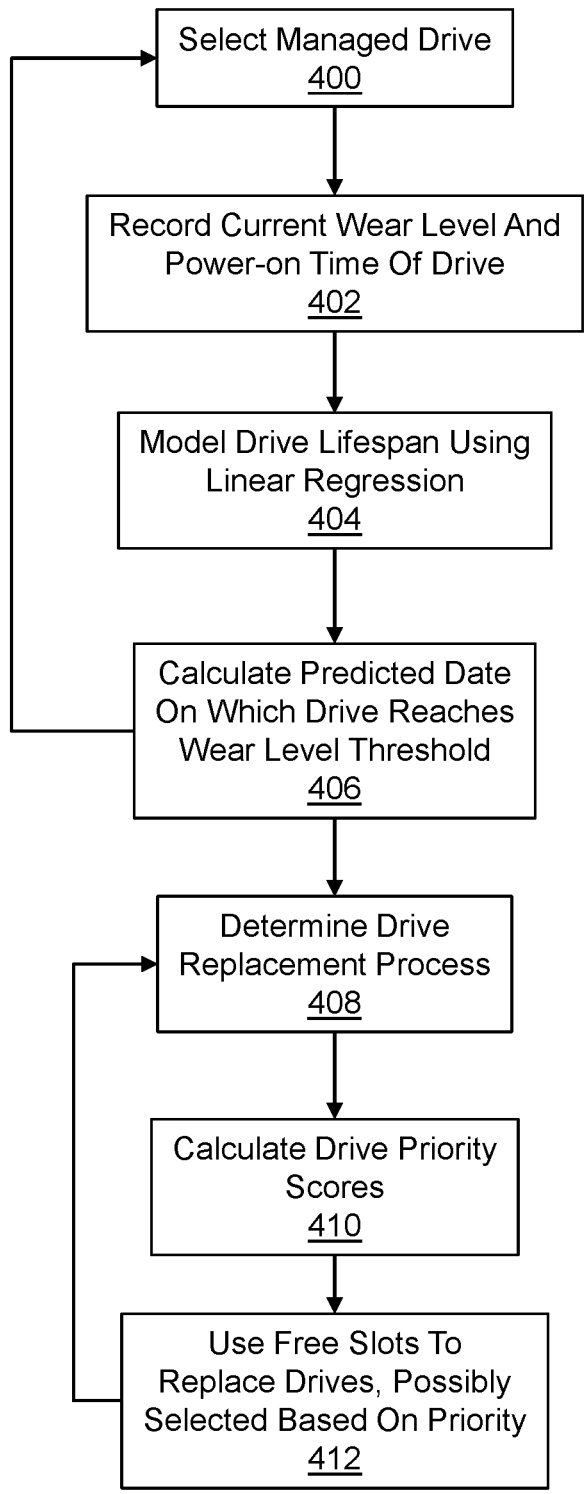
FIG. 4 illustrates operation of a drive wear level prediction and prioritization module.

FIG. 4 illustrates operation of the drive wear level prediction and prioritization module. Step 400 is selecting one of the managed drives. Step 402 is recording the current wear level and power-on time of the selected drive. Step 404 is modeling the lifespan of the selected drive using linear regression analysis with the current and previously recorded wear level and power-on time of the selected drive. It will be appreciated that the model may become more accurate as additional wear level and power-on data is recorded. Step 406 is calculating a date on which the drive will reach a predetermined wear level threshold corresponding to readiness for swap out, e.g., 95%. Steps 400 through 406 may be performed at fixed time intervals, e.g., daily, for each of the managed drives. Step 408 is calculating a drive replacement process. The drive replacement process may include determining a date or date range in which none of the managed drives has reached 100% wear level and a maximum number of drives are ready for swap out, e.g., N drives at from 95% to 99% wear level. Step 410 is calculating priority scores for the drives that are ready for swap out. Drive swap out is performed in step 412 using the available empty drive slots. For a storage array with N empty drive slots, up to N drives can be swapped out as a single batch. If the number of drives that are ready to be swapped out in the drive replacement process is less than or equal to N, then all the drives can be swapped out as a single batch. If the number of drives that are ready to be swapped out in the drive replacement process is greater than N, then the drives are swapped out in multiple batches according to relative drive priority scores as will be explained below. After each batch of drives is replaced and removed, the newly vacated drive slots become available for the next batch.

Figure 5:
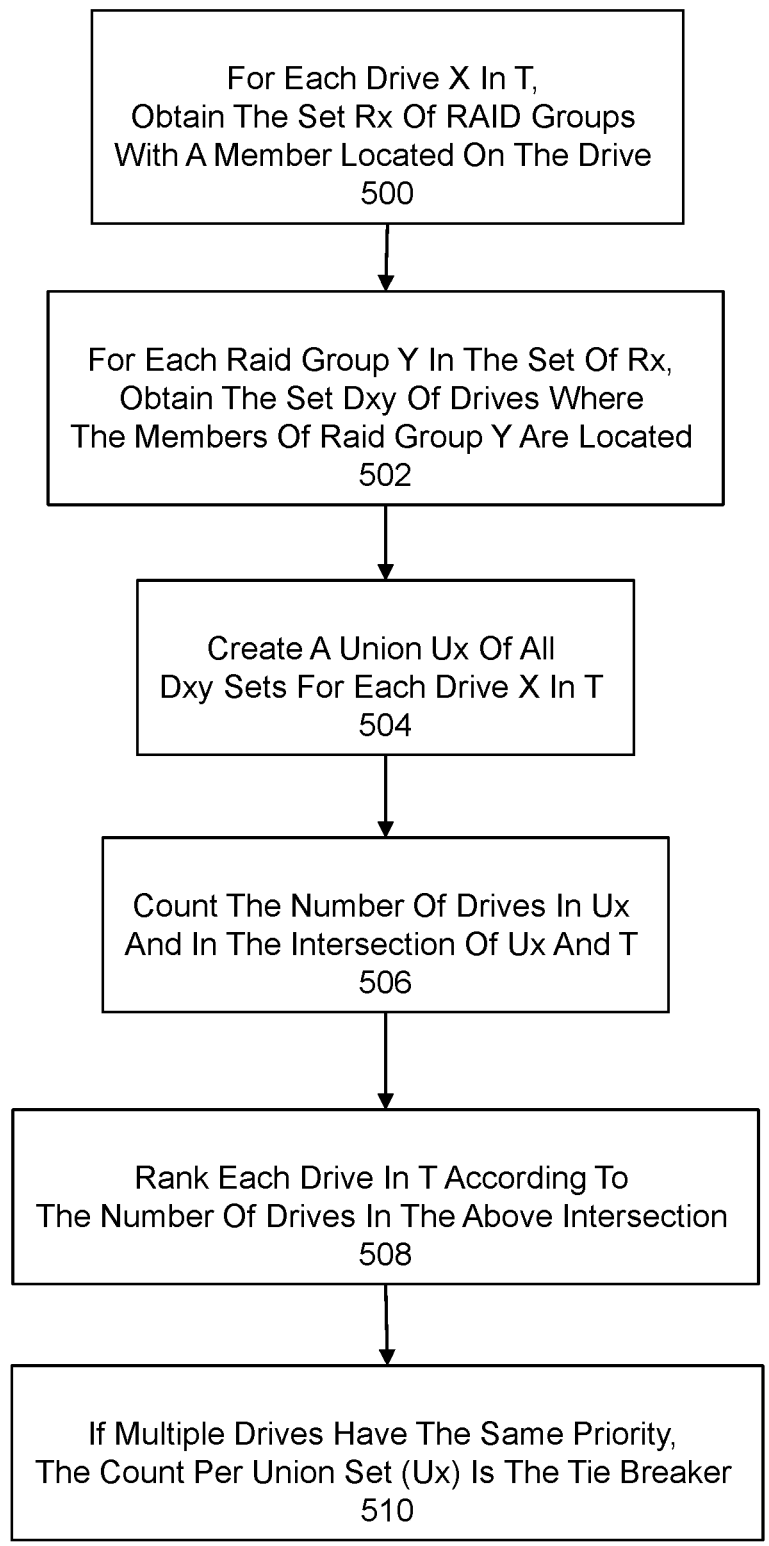

FIGS. 5 and 6 illustrate drive replacement priority calculation and ranking. Replacement priority is determined by the risk of multiple member failures in a RAID group. Drives with higher relative priority scores are replaced before drives with lower relative priority scores. For every managed drive, a set of RAID groups with a member located on the drive is maintained. For every RAID group, a set of drives where a RAID member is located is maintained. T is the target set of drives that will be replaced in the current batch. The priority of each drive that is targeted to be replaced can be computed as follows. For each drive x in T, the set Rx of RAID groups with a member located on the drive is obtained as indicated in step 500. For each RAID group y in the set of Rx, the set Dxy of drives where the members of RAID group y are located is obtained as indicated in step 502. As shown in step 504, a union Ux of all Dxy sets for each drive x in T is created. The union set Ux represents the risk zone of drive x, where a simultaneous failure of drive x and any drive in Ux can cause either data loss (e.g., in the case of RAID 5) or degradation (e.g., in the case of RAID 6). The number of drives in Ux and in the intersection of Ux and T is counted as indicated in step 506. As shown in step 508, each drive in T is ranked in priority according to the number of drives in the intersection of Ux and T. A higher count indicates that the drive is more likely to cause multiple member failures in a RAID group. If multiple drives have the same priority, i.e., equal counts of drives in the intersection of Ux and T, then count per union set (Ux) is used as a tie breaker as indicated in step 510.

In the example shown in FIG. 6, RAID 5 (4+1) groups (a–1) are distributed over fourteen drives (1-14), where each drive is subdivided into 5 equal size partitions and each partition can hold a RAID member. This configuration can be viewed as a conceptual matrix of 14 rows (drives) and 5 columns (partitions). Each RAID group includes 5 members distributed over 5 drives. If there is only 1 empty drive slot and drives 3, 6, and 10 are to be replaced sequentially then the target set T={3, 6, 10}. The drive with the highest priority will be replaced first. In accordance with the algorithm described above, R3={a, b, c, e}, R6={e, f, g}, R10={h, j, k, l}, U3={1, 2, 3, 4, 5, 6, 7, 8, 9}, U6={3, 4, 5, 6, 7, 8, 9} and U10={10, 11, 12, 13, 14}. Drive 10 has the lowest priority, as U10 and T have the smallest intersection set, i.e. {10}. Drives 3 and 6 have the same priority because both drives have the same intersection set, i.e. {3, 6}. With the count of drives in the union set as the tie breaker, drive 3 is awarded greater priority over drive 6 because U3 is larger than U6. Therefore, the drives are ranked in order of descending priority as drive 3, drive 6, drive 10. Because only one empty drive slot is available, the drives may be swapped out in that order in three separate service visits. If two empty drive slots were available, then drives 3 and 6 might be swapped out in a first service visit and drive 10 would be swapped out in a subsequent batch.

Although advantages should not be viewed as required or limiting, some aspects and implementations disclosed herein may improve maintenance efficiency by automatically scheduling a maximum possible number of drives to be swapped out during each service visit. Moreover, the order of drive swap out is automatically calculated to reduce the likelihood of data loss or degradation.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented with a storage system comprising a plurality of non-volatile data storage drives, comprising:
for each of the drives, monitoring drive wear level;
for each of the drives, monitoring drive power-on time;
generating, for each of the drives, a model of expected drive lifespan based only on the monitored drive wear level and the monitored drive power-on time as variables, resulting in a plurality of drive models;
for each of the drives, using the corresponding drive model to calculate a point in time when that drive will have been in service for a predetermined portion of its modeled lifespan; and
swapping out ones of the drives on or after the calculated points in time when those drives have been in service for the predetermined portion of their respective lifespans according to the corresponding drive model.

2. The method of claim 1 wherein the predetermined portion of the modeled drive lifespan corresponds to an expected time remaining before drive failure and wherein swapping out ones of the drives on or after the calculated points in time when those drives have been in service for the predetermined portion of their respective lifespans according to the corresponding drive model comprises swapping out the drives before expected time of drive failure.

3. The method of claim 2 comprising calculating a time window for swapping out ones of the drives in batches of N drives, where N is a number of free drive slots of the storage system.

4. The method of claim 3 comprising calculating a respective priority of each of the drives that have been in service for the predetermined portion of their respective lifespans according to the models.

5. The method of claim 4 wherein the drives that have been in service for the predetermined portion of their respective lifespans according to the drive models number greater than N and comprising selecting N of the drives to swap out in a batch based on the respective priority of each of the drives.

6. The method of claim 4 wherein T is a target set of drives that will be replaced in a current batch and calculating the respective priority of each of the drives comprises:
for each drive x in T, obtaining a set Rx of RAID groups with a member located on the drive;
for each RAID group y in the set of Rx, obtaining a set Dxy of drives where the members of RAID group y are located;
creating a union Ux of all Dxy sets for each drive x in T;
counting the number of drives in Ux and in an intersection of Ux and T; and
ranking each drive in T according to a number of drives in the intersection.

7. The method of claim 6 comprising using count per union set (Ux) as a tie breaker for multiple drives having equal counts of drives in the intersection of Ux and T.

8. A non-transitory computer-readable storage medium storing instructions that when executed by a computer cause the computer to perform a method with a storage system comprising a plurality of non-volatile data storage drives, the method comprising:
for each of the drives, monitoring drive wear level;
for each of the drives, monitoring drive power-on time;
generating, for each of the drives, a model of expected drive lifespan based only on the monitored drive wear level and the monitored drive power-on time as variables, resulting in a plurality of drive models;
for each of the drives, using the corresponding drive model to calculate a point in time when that drive will have been in service for a predetermined portion of its modeled lifespan; and
swapping out ones of the drives on or after the calculated points in time when those drives have been in service for the predetermined portion of their respective lifespans according to the corresponding drive model.

9. The non-transitory computer-readable storage medium of claim 8 wherein the predetermined portion of the modeled drive lifespan corresponds to an expected time remaining before drive failure and wherein swapping out ones of the drives on or after the calculated points in time when those drives have been in service for the predetermined portion of their respective lifespans according to the corresponding drive model comprises swapping out the drives before expected time of drive failure.

10. The non-transitory computer-readable storage medium of claim 9 comprising calculating a time window for swapping out ones of the drives in batches of N drives, where N is a number of free drive slots of the storage system.

11. The non-transitory computer-readable storage medium of claim 10 comprising calculating a respective priority of each of the drives that have been in service for the predetermined portion of their respective lifespans according to the models.

12. The non-transitory computer-readable storage medium of claim 11 wherein the drives that have been in service for the predetermined portion of their respective lifespans according to the drive models number greater than N and comprising selecting N of the drives to swap out in a batch based on the respective priority of each of the drives.

13. The non-transitory computer-readable storage medium of claim 11 wherein T is a target set of drives that will be replaced in a current batch and calculating the respective priority of each of the drives comprises:
for each drive x in T, obtaining a set Rx of RAID groups with a member located on the drive;
for each RAID group y in the set of Rx, obtaining a set Dxy of drives where the members of RAID group y are located;
creating a union Ux of all Dxy sets for each drive x in T;
counting the number of drives in Ux and in an intersection of Ux and T; and
ranking each drive in T according to a number of drives in the intersection.

14. The non-transitory computer-readable storage medium of claim 13 comprising using count per union set (Ux) as a tie breaker for multiple drives having equal counts of drives in the intersection of Ux and T.

15. An apparatus comprising:
at least one compute node;

a drive array comprising a plurality of drive slots and a plurality of non-volatile data storage drives mounted in the drive slots; and program code non-transitory computer-readable storage medium that when run by a processor monitors drive wear level of each of the drives, monitors drive power-on time of each of the drives, generates, for each of the drives, a model of expected drive lifespan based only on the monitored drive wear level and the monitored drive power-on time as variables, resulting in a plurality of drive models, uses, for each of the drives, the corresponding drive model to calculate a point in time when that drive will have been in service for a predetermined portion of its modeled lifespan, and prompts ones of the drives to be swapped out on or after the calculated points in time when those drives have been in service for the predetermined portion of their respective lifespans according to the corresponding drive model.

16. The apparatus of claim 15 wherein the predetermined portion of the modeled drive lifespan corresponds to an expected time remaining before drive failure and wherein the program code prompts ones of the drives to be swapped out before expected time of drive failure.

17. The apparatus of claim 16 wherein the program code calculates a time window for swapping out ones of the drives in batches of N drives, where N is a number of free drive slots of the storage system.

18. The apparatus of claim 17 wherein the program code calculates a respective priority of each of the drives that have been in service for the predetermined portion of their respective lifespans according to the models.

19. The apparatus of claim 18 wherein the drives that have been in service for the predetermined portion of their respective lifespans according to the drive models number greater than N and wherein the program code selects N of the drives to swap out in a batch based on the respective priority of each of the drives.

20. The apparatus of claim 18 wherein T is a target set of drives that will be replaced in a current batch and the program code calculates the respective priority of each of the drives by:

for each drive x in T, obtaining a set Rx of RAID groups with a member located on the drive;

for each RAID group y in the set of Rx, obtaining a set Dxy of drives where the members of RAID group y are located;

creating a union Ux of all Dxy sets for each drive x in T;

counting the number of drives in Ux and in an intersection of Ux and T; and ranking each drive in T according to a number of drives in the intersection.

* * * * *